INVENTOR.
L. ALLAN CROSS, Jr.
BY Albert Sperry

Feb. 7, 1967 L. A. CROSS, JR 3,303,492

SIGNAL TRANSLATING EQUIPMENT

Filed May 16, 1963 3 Sheets-Sheet 2

INVENTOR.
L. ALLAN CROSS, Jr.
BY
Albert Sperry

SIGNAL TRANSLATING EQUIPMENT

Filed May 16, 1963

3 Sheets-Sheet 3

INVENTOR.
L. ALLAN CROSS, Jr.
BY
Albert Sperry

United States Patent Office 3,303,492

Patented Feb. 7, 1967

3,303,492
SIGNAL TRANSLATING EQUIPMENT

Laurence Allan Cross, Jr., Lambertville, N.J., assignor, by mesne assignments, to Randomatic Data Systems, Inc., Trenton, N.J., a corporation of New Jersey Filed May 16, 1963, Ser. No. 280,964
18 Claims. (Cl. 340—347)

This invention relates to methods and means for utilizing various series of coded impulses in actuating or controlling equipment such as business machines, data processsing equipment or the like employed in preparing, sorting, interpreting, or otherwise handling cards or other information carrying means. The invention also may be used in storing coded information for subsequent utilization and is particularly adapted for use in converting or translating successive electrical or mechanical impulses into simple mechanical movements. The invention further may embody switching means to cycle or select specific circuits in step or in sequence with predetermined mechanical movements.

It has been common practice heretofore to apply coded electrical or mechanical impulses to elements of equipment such as card sorters, card punchers, or information storage devices by means of solenoids or the like. However, when the signal code employed is complex or is used to represent a relatively large number, or a letter of the alphabet, the equipment required to translate or use the signals received may render it necessary to use such a large number of solenoids or such complicated translating mechanism as to render the equipment extremely expensive or impractical. Thus, for example, it is common practice to employ a signal or impulse of a binary character wherein two of five code channels are selectively activated or energized to represent any number from 0 to 9. However, when a whole number to be translated from a series of such impulses contains several digits, it is often necessaray to use one set or sector of the equipment to translate each digit. Accordingly, in translating a six digit figure while using five signals responsive means for each digit of the number, thirty separate and selectively operable elements are required in order to translate a complete number. If the signal is more complex, as when a modified binary system or other code is used to represent a letter of the alphabet, a mathematical symbol or some other character, the number of channels and the number of possible combinations and series of signal impulses which the equipment is required to receive and translate may be much further increased. The number of solenoids, switches, levers, and other elements to be operated may then become so great as to render the equipment too complicated for practical and economical consideration. Furthermore, a separate electrical stepping switch may be required to switch circuits in accordance with the sequence of signals or impulses employed in actuating the equipment.

In accordance with the present invention, these objections and limitations of business machines and data processing equipment are reduced or eliminated, and means are provided which are relatively simple and economical to produce and use in translating a series of coded signals or impulses and for converting them into specific and limited mechanical operations. In addition, switching means which are an integral part of the present invention may be provided to switch electrical circuitry simultaneously with the translation of sequential impulses.

These results are preferably attained by employing a plurality of mechanical elements which are divided into a number of groups or sectors corresponding to the number of code channels employed in transmitting the signal to be utilized. Selected mechanical elements of selected groups or sectors of such elements then can be actuated successively in response to successive input signals or impulses impressed on the equipment. In this way, signals or impulses of a binary, modified binary or other coded character can be caused to actuate only that number of mechanical elements corresponding to the number of code channels being employed in transmitting any character or digit of a signal. On the other hand, the number of successive elements in the various groups or sectors in the equipment which are actuated upon completion of a series of signals will depend upon the number of digits or characters required to record a completed number, word or portion of the signal to be translated.

In the preferred form of the invention herein shown and described, the mechanism is arranged so that an initial group of signal impulses is operable to actuate a first element in each of selected groups of elements in the equipment. Thereafter, control means in the equipment are moved step by step or selectively to other positions adjacent each of the other elements in said groups to actuate other elements of selected groups or sectors in response to subsequent or successive signals or impulses received by the equipment. As a result, the equipment actually embodies two successively operable selector means permitting a complex series of input signals to effect the selection and operation of a limited number of chosen member from a relatively large number of such members. If desired, the control means in the equipment may be directly connected to sequential switching means to provide any desirable electrical circuitry changes in combination and in step or timed relation with each input of signal impulses.

Accordingly, the principal objects of the present invention are to simplify data processing equipment employed for translating successive coded signals, to utilize successive coded impulses to actuate a limited number of mechanical elements of data processing equipment, to employ a multi channel input signal to actuate an element contained in each of a plurality of selected groups of elements, to provide mechanism including a plurality of groups of elements and means progressively movable to the elements of each group for selectively actuating the same in response to successive coded input signals or impulses, and to provide electrical switching mechanism to change selected circuitry in response to successive coded input signals or impulses.

These and other objects and features of the present invention will be apparent from the following description thereof wherein reference is made to the figures of the accompanying drawings.

Figures 1, 2:
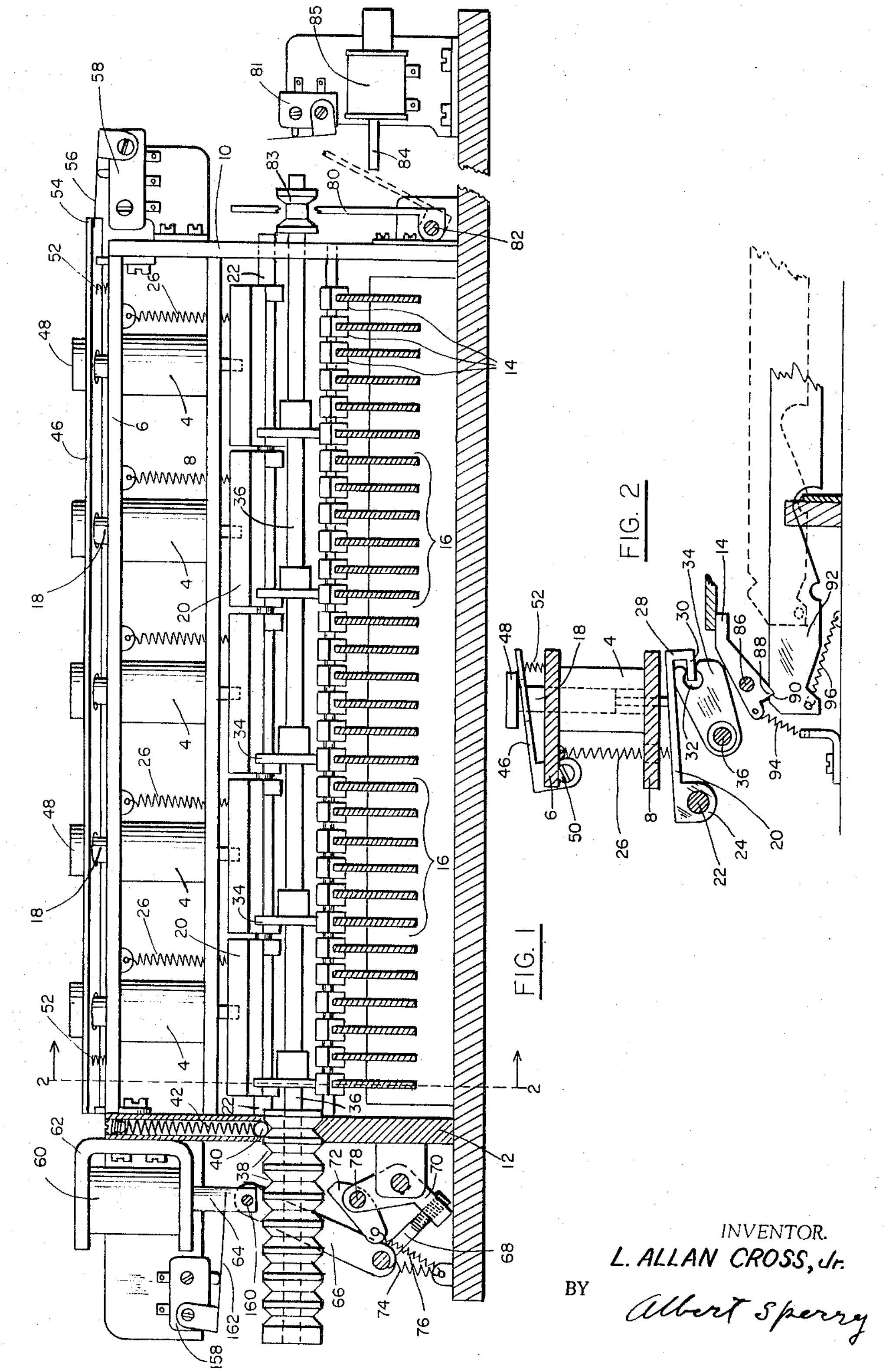
FIG. 1 is a vertical sectional view through a portion of a typical form of equipment embodying the present invention.
FIG. 2 is a transverse sectional view of the equipment illustrated in FIG. 1 taken on the line 2—2 thereof.

In that form of the invention chosen for purposes of illustration in FIGS. 1 and 2, the equipment is designed to control elements of data processing equipment such as card sorting and handling equipment of the type shown and described in copending application Serial No. 272,485. However, the present invention is also adapted for use in combination with card punching mechanism, data storing and handling equipment and substantially any other type of equipment wherein mechanical elements are adapted to be actuated in response to a series of coded impulses.

The preferred form of the invention illustrated is designed for use in response to a binary type of coded input signal employing five signal channels. Each of the channels employed is connected to one of the five solenoids 4 arranged in a row in upper and lower horizontal frame members 6 and 8 extending between the right and left end frame members 10 and 12 respectively as illustrated in FIG. 1. A plurality of mechanical elements 14 are located below the solenoids 4 and are divided into five groups or sectors 16 of elements with one group of elements being associated with each of the solenoids 4. On the other hand, the number of the elements 14 in each group or sector 16 associated with a solenoid 4 will depend on the number of digits, characters or other parts of a whole number, word or other data or information embodied in a series of signals to be translated. Thus, when the signals to be received by the equipment may represent any number from 1 to 999,999, each of the groups 16 should include six elements 14 so as to be capable of translating a six digit figure. The total number of the mechanical elements 14 required for complete translation of any series of signals representing any number from 1 to 999,999 when using a five channel binary signal system will then be thirty elements.

Of course, if the signals to be translated are numbers, words, or characters embodying only two, three or four digits, letters or parts, only two, three or four of the mechanical elements 14 need be present in each of the groups of elements 16. On the other hand, if the data or information to be translated consists of words or other material which may be composed of a larger number of letters or parts, then a correspondingly larger number of the mechanical elements 14 will be present in each of the groups 16. Similarly, if the equipment is to be employed to translate signals requiring more channels and more solenoids 4, the number of groups 16 of the elements 14 will need to be increased. In any case, the number of elements 14 employed will equal the number of channels to be used multiplied by the number of digits, character or parts embodied in a complete number, word or the like to be translated.

The mechanical linkage illustrated in FIG. 1 is typical of elements which may be used in equipment embodying the present invention and illustrates the principle of input motion translation to the various mechanical elements 14. However, any other mechanical means that conforms to the principle of motion translation herein disclosed will conform to the invention. As shown in FIG. 1, each of the solenoids 4 has a plunger or armature 18 which is movable downward when the solenoid is energized. The lower end of each plunger engages a sector plate 20 having one end or edge thereof pivotally mounted on a rod 22 by means of the ears 24 and extending lengthwise of the equipment below and at one side of the row of solenoids 4. The sector plates are each urged upwardly by a spring 26 secured at its upper end to the upper horizontal frame member 6 and extending through an opening in the lower horizontal frame member 8. The free edge 28 of each sector plate 20 is turned downwardly and inwardly to present a flange 30 which projects into a recess 32 in an actuating member 34.

There is one sector plate 20 and one actuating member 34 for each group 16 of the mechanical elements 14. Each sector plate is substantially equal in width to the width of a group 16 of the mechanical elements 14 whereas the actuating members 34 are pivotally mounted on but longitudinally movable with a stepping rod 36. The stepping rod 36 is slidably mounted in the vertical end frame members 10 and 12 for successive movements longitudinally with respect to the actuating members. The flanges 30 on the sector plates 20 are thereby caused to remain in operative engagement with recesses 32 in the actuating members 34 while the latter are moved step by step longitudinally of the equipment and into successive positions over each of the mechanical elements 14 of the groups of elements 16. The stepping rod 36 is provided with a series of annular recesses 38 engageable by a detent 40 which is urged toward the rod 36 by a spring 42 housed in the end frame member 12. The number of the recesses 38 in rod 36 corresponds to the number of elements 14 in each of the groups 16. Moreover, the recesses 38 are spaced and arranged so that the actuating members 34 carried by rod 36 will be accurately positioned above one or another of the actuating elements in each position to which the stepping rod may be moved and in which it may be held by the detent 40. Accordingly, as shown in FIG. 1, the rod 36 has six annular recesses 38 which are positioned to hold the rod in each of six successive positions to which it may be moved in a lengthwise direction and into positions in which the actuating members 34 are successively located over one after another of the mechanical elements 14 in each of the groups of elements 16.

Since the actuating members 34 are pivotally movable with respect to the stepping rod 36 and are continuously engaged by the flange 30 of a sector plate 20, the solenoids 4 may be selectively energized to cause the plungers 18 thereof to depress selected sector plates 20 and the actuating member 34 associated therewith. Furthermore, each actuating member thus moved will serve to depress the selected mechanical element 14 over which it is positioned by the progressive or sequential movement of the stepping rod 36. In this way, the input signals or impulses impressed on the solenoids 4 serve to select which of the sector plates 20 and actuating members 34 associated with the sets 16 of mechanical elements shall be actuated, whereas the stepping rod, by its longitudinal movement serves to select which of the mechanical elements 14 in each of the selected groups 16 will be actuated by the input signals. This dual selecting action of the equipment renders it possible to effect a detailed and accurate selection and sequence in the operation of any of a large number of mechanical elements in response to a relatively complex input signal.

The stepping rod 36 which serves to select the elements 14 within each of the groups 16 which are to be operated can be moved from one of its various positions to another by any suitable means and in any desired manner. However, as shown in FIG. 1, such movement, for simplicity, is preferably a sequential or progressive movement whereby the actuating members 34 are located over the mechanical elements 14 at the left hand side of each of the groups 16 and progress one step at a time to the right and into position over each of the other elements of the groups 14 until they are located over the elements at the right hand side of each of the groups of elements. Thereafter, the stepping rod 36 and the actuating elements 34 are returned to the left in readiness for operation in response to a subsequent series of input signals.

The mechanism illustrated in FIG. 1 for so moving the stepping rod 36 includes a plate 46 extending beneath the heads 48 of all of the plungers 18 of the solenoids 4 and pivotally mounted at 50. The plate 46 is urged upward against the heads of the plungers by the spring means 52 but will be depressed against the action of such spring means whenever any one or more of the solenoids 4 is energized. The end 54 of the plate 46 bears against the arm 56 of a micro-switch 58 mounted on the end frame member 10 so that the switch will be closed each time the solenoids 4 are energized. Switch 58 in turn is connected through relays to a stepping solenoid 60 supported by a bracket 62 mounted on the vertical frame 12 to energize the latter solenoid 60 and move its plunger 64 upward each time the solenoids 4 are energized. The plunger 64 of stepping solenoid 60 is connected by a pin 160 to one end of a link 66, whereas, the opposite end of link 66 is connected to a rod 68 secured to one end of a bell crank member 70. The opposite end of the bell crank carries a pawl 72 engageable with the recesses 38 of the stepping rod 36. Spring 74 serves to pull the link 66 and the plunger 64 of the solenoid 60 downward, whereas, the solenoid 60, when energized, serves to pull the plunger 64 and link 66 upward against the action of the spring 74. Spring 76 serves to cause the pawl 72 to rock about the pivot pin 78 so that the pawl will be positioned to engage and advance the stepping rod 36 toward the right, as seen in FIG. 1, each time the solenoids 4 are energized by an input signal and each time the plate 46 is moved downward to actuate the micro-switch 58 and energize solenoid 60. The micro-switch 58 also serves to establish a holding circuit including solenoid 60 so that plunger 64 will travel a full stroke irrespective of the duration of input signal. As plunger 64 reaches the end of its upward stroke, pin 160 operates arm 162 and the micro-switch 158 which opens the circuit to solenoid 60. Thereafter, spring 74 will pull the plunger 64 of solenoid 60 downward and the bell crank 70 will move to cause pawl 72 to be positioned to engage the next recess 38 in the stepping rod 36 in readiness for the receipt of another signal impulse by the solenoids 4.

The return or reverse movement of the stepping rod 36 also can be effected by any suitable means and, as shown, a return lever 80 is pivotally mounted at 82 and has its free end engaged in collar 83 fixed on the end of rod 36 which projects beyond vertical end frame member 10. The lever 80 is rocked in a clockwise direction about its pivot 82 by the rod 36 as it is advanced step by step from one position to another. Return means in the form of a solenoid plunger 84 engageable with the lever 80 and energized by the closing of switch 81 at the conclusion of the advancement of stepping rod 36 may be employed for this purpose. However, any other suitable activating means may be employed to rock the lever 80 in a counterclockwise direction about the pivot 82 to effect the return movement of rod 36. This lever 80 may, in the alternative, be actuated by means connected to a driven shaft of equipment embodying the mechanical elements 14 for operation at the end of a cycle of operations corresponding to the receipt of a series of input signals representing a multi-digit number or other completed word, character or the like.

For purposes of illustration, the mechanical elements 14 of the translating equipment of the present invention are shown in FIG. 2 to be in the form of arms which are pivoted at 86 and have their lower ends 88 positioned to enter the recesses 90 in a card selector bar 92 of the card handling device of application Serial No. 272,485. The arms or elements 14 are each urged toward their bar locking positions by a spring 94, whereas the upper ends of the arms are located beneath the actuating members 34 in position to be depressed thereby when the actuating members are moved downward. The bars 92 are each urged to the right as seen in FIG. 2 by a spring 96. Therefore, when any mechanical element 14 is depressed by an actuating member 34, the card selector bar 92 associated therewith will be released to permit movement of the bar to the right and to the raised dotted line position shown in FIG. 2. Upon completion of the input signal used in actuating the card selector device and at the conclusion of a cycle of operation of the device, the card selector bars 92 are moved to the left as seen in FIG. 2 so that the mechanical elements 14 will be moved to their bar locking positions shown in full lines in FIG. 2 under the action of the springs 94. At the same time, the solenoid 85 or a mechanical means actuated by a driven shaft of the card selecting equipment will serve to actuate the return lever 80 so that stepping rod 36 and actuating members 34 will be moved to the left as seen in FIG. 1 overcoming the restraining action of detent 40. The equipment will then be restored to its initial operating condition in readiness for operation in response to another series of coded input signals.

Means such as the card selector bars 92 of the card selecting equipment, when released and raised by the operation of the translator above described and prior to return thereof to their full line positions, serve as coded signal storing or memory means which can be utilized in any desired way to preserve or use the coded input signal received by the translator. Such means can, of course, be embodied in any preferred type of signal utilizing or data processing equipment such as the card punching or coding equipment of application Serial No. 287,275 or any other mechanism or apparatus desired.

Figure 3:
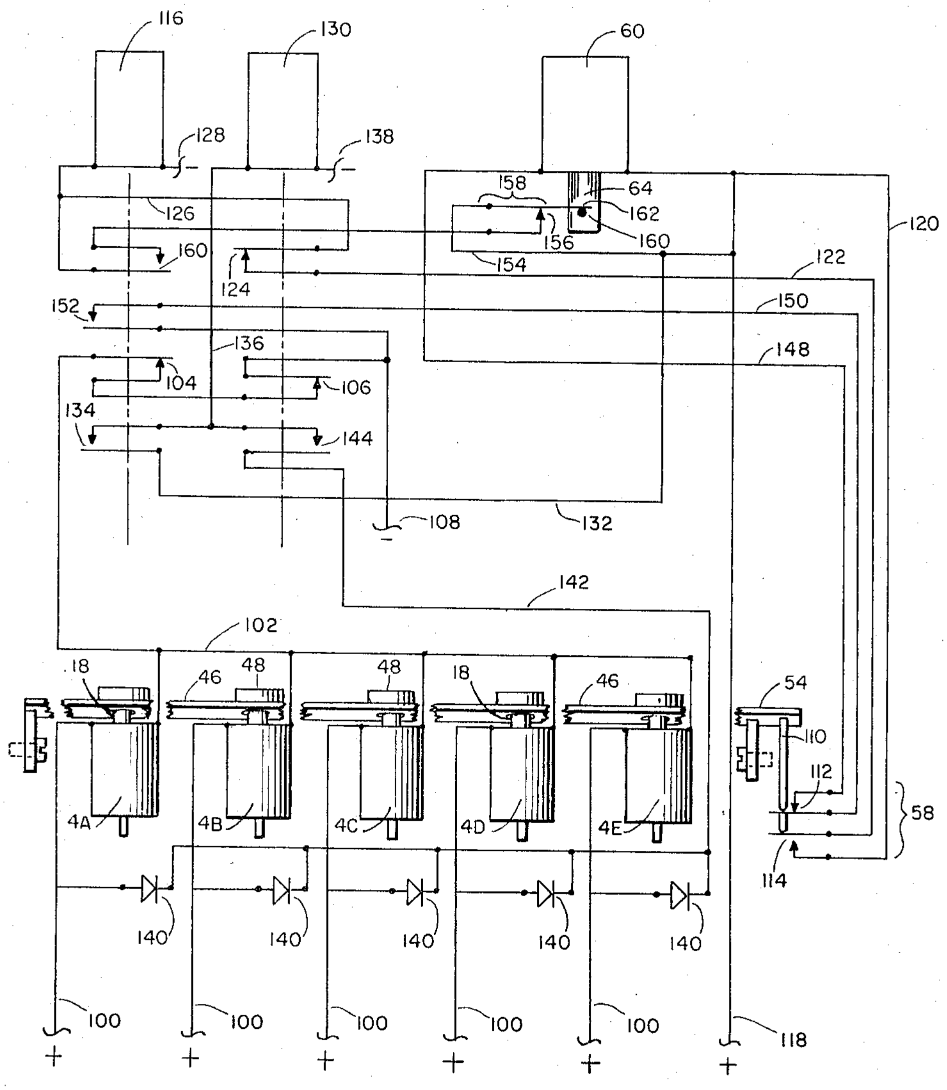
FIG. 3 is a wiring diagram illustrating a typical form of electrical circuitry which may be employed in actuating the equipment of FIGS. 1, 2 and 4.

In order to control and assure the proper timing and sequence of operation of the various parts of the translator shown in FIGS. 1 and 2, a suitable control circuit such as that shown in FIG. 3 may be employed. As there shown, the various solenoids 4 are indicated at 4A, 4B, 4C, 4D and 4E. The coded input signal is impressed on selected solenoids by the positive conductors 100, which, for example, may be the signal channels of a five channel, binary signal system serving to energize two selected solenoids each time a digit or portion of a series of signals is to be translated. The solenoids signal circuits are completed through the common line 102 and the normally closed switches 104 and 106 to the ground or negative side of a power source at 108.

When any one or more of the solenoids 4A, 4B, etc. is energized to move the plungers 18 thereof downward, the plate 46 is forced downward, and the end 54 thereof serves to move the operating member 110 of switch 58 downward to break the upper contacts 112 thereof and to close the lower contacts 114. This operation of switch 58 completes a circuit for energizing relay 116 in that current from the positive line 118 flows through line 120, the closed lower contacts 114 of switch 58 and line 122 to the normally closed contacts 124 of relay 130 and thence through line 126 and relay 116 to ground at 128. Upon energizing relay 116, the control for keeping relay 116 energized is passed to micro-switch 158 through a holding circuit in that current from the positive line 118 flows through line 154, through the normally closed contacts 156 of micro-switch 158, through the now closed contacts 160 of relay 116, thence through relay 116 itself and to ground 128. Relay 116 will now stay closed as long as the contacts 156 of micro-switch 158 remain closed, irrespective of other actions.

When relay 116 is thus energized, the line 102 which completes the circuits by which the signal responsive solenoids 4A, 4B, etc. are actuated will be broken at the contact 104 whereby the solenoids 4A, 4B, etc. will be deenergized and further operation thereof will be prevented until the translating equipment has completed a cycle of operations. Moreover, the energizing of relay 116 results in the completion of an actuating circuit for relay 130 by the flow of current from the positive line 118 through line 132 and closed contact 134 associated with relay 116 to line 136 and relay 130 to ground at 138. The relay 130 is held energized by this circuit and by any potential applied to the signal input channels 100 through the diodes 140, line 142 and closed contact 144.

In this way, the circuits for actuating the solenoids 4A, 4B, etc. are also broken at contact 106. Therefore, recycling of the equipment cannot occur until both of the relays 116 and 130 are de-energized after each digit or portion of the series of signals to be received has been fully translated by the mechanical elements 14 of the equipment. Erroneous recycling at any time prior to completion of stepping or advancing movement of the stepping bar 36 and actuating members 34 is accordingly prevented. Moreover, such control of the equipment renders it possible to use input signals which vary in duration while assuring the proper sequential operation of the various parts of the equipment.

The de-energizing of the solenoids 4A, 4B, etc., after the input impulse had ceased, will allow the plungers 18 thereof and the plate 46 to move upward whereby the lower contacts 114 of switch 58 will be broken and upper contacts 112 of the switch will be closed. When this occurs, the stepping solenoid 60 will be energized by the passage of current from positive line 118 to the solenoid 60 and thence through line 148, closed upper contact 112 of switch 58, line 150 and the now closed contact 152 associated with the relay 116 to ground at 108. Solenoid 60 will thus be operated to advance the stepping rod 36 and actuating members 34 into position wherein other selected mechanical elements 14 of the various groups 16 of elements may be actuated.

The operation of solenoid 60 in moving its plunger 64 upward will serve to cause the pin 160 by which the plunger 64 is connected to link 66 to engage the operating arm 162 of the switch 158 as shown in FIG. 1 whereby the contact 156 of switch 158 will be opened.

The operation of switch 158 to open the contacts 156 serves to complete the cycle of operation in that it breaks the holding circuit by which the relay 116 was being energized. The contacts 134 and 152 associated with the relay 116 will accordingly be opened. The circuit including relay 130 will then be broken at contact 134, whereas the circuit including the stepping solenoid 60 will be broken at contact 152. However, should there be any potential in lines 100 at this time due to a longer than necessary impulse signal, relay 130 will remain energized by means of its closed contact 144. This feature is a control measure to prevent erroneous re-cycling of the translator. When both relays 130 and 116 are de-energized, the circuit will be restored to its idle condition, as indicated in FIG. 3, in readiness for renewed operation in response to the next coded input signal to be impressed on the solenoids 4A, 4B, etc.

Figure 4:
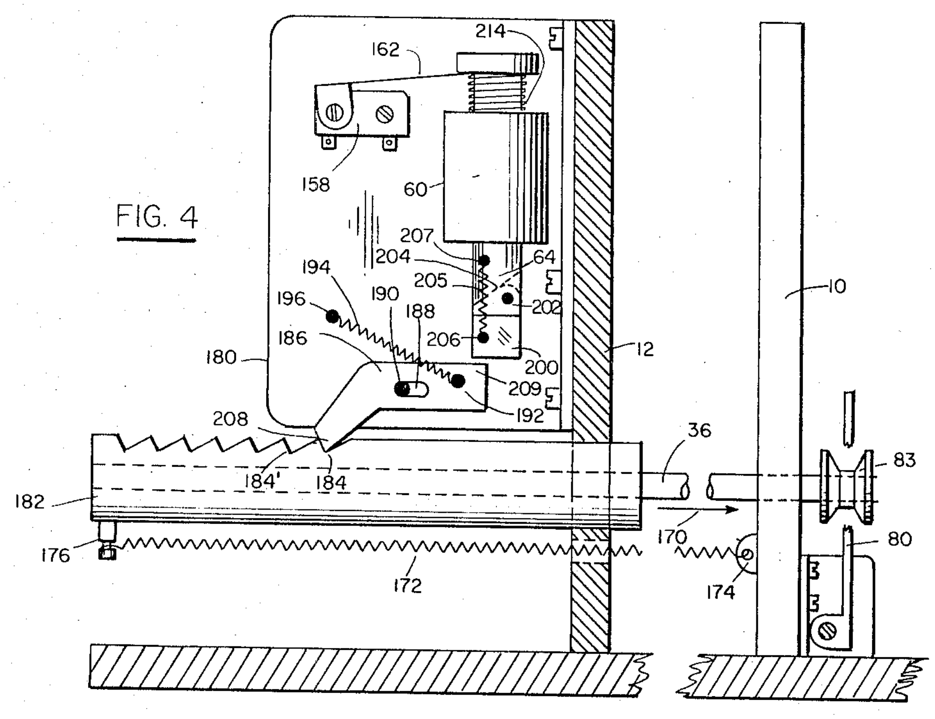
FIG. 4 is a vertical sectional view illustrating an alternate form of indexing mechanism which may be used in the equipment of the present invention.

The elements employed for indexing the stepping rod 36 as shown in FIG. 1 are typical of mechanism which may be employed for this purpose. However, other and alternative means may be used for advancing the stepping rod 36 in a controlled manner. Thus, as shown in FIG. 4, an escapement indexing arrangement for the stepping rod maintains a constant tension on rod 36 in the direction of the arrow 170. Such tension is preferably established by the use of tension spring 172 which is affixed to frame member 10 and passes through frame member 12 with one end of the spring 172 secured to the stud 176 attached to the shaft 182. The opposite end of spring 172 is secured to a spring retainer 174 on the frame member 10. The stepping rod is held against undesired movement under the action of spring 172 by an indexing pawl 186 which, in its holding position, has an end 208 thereof in engagement with one of the notches 184, 184', etc. in the indexing shaft 182 secured to the end of the stepping rod 36. The indexing shaft 182 has a number of notches 184, 184', etc. formed in the upper surface thereof in position to be engaged by the end 208 of pawl 186. The number of notches formed in the indexing shaft 182 corresponds to the number of the mechanical elements 14 in each of the groups 16 thereof and to the number of advancing steps which the stepping rod 36 is required to make in completing a cycle of operations. The indexing shaft 182 may have the notches 184, 184', etc. cut in the top portion only of the indexing shaft, as shown in FIG. 4, so that the remainder of the circumference of the shaft 184 serves as a bearing for the shaft within frame member 12.

The indexing pawl 186 is provided with an elongated slot 188 therein through which a pin 190 mounted on the plate 180 extends. The pawl 186 is normally urged by spring 172 into a position wherein pin 190 is located adjacent the left-hand end of the slot 188, as shown in FIG. 4, when the end 208 of the pawl engages one of the notches 184, 184', etc. of the indexing shaft 182. At the same time, the notch-engaging end 208 of the pawl 186 is urged into engagement with one of the notches 184, 184', etc. in the indexing shaft by the action of a relatively light spring 194 which has one end thereof secured to the pawl 186 at 192, whereas, the opposite end of the spring 194 is secured to a pin 196 mounted on the plate 180.

An operating arm 200 is pivotally mounted on a pin 202 carried by the plunger 64 of solenoid 60 and is positioned within a slot 204 in the lower end of plunger 64. With this construction, the operating arm 200 is normally maintained in a vertical position by the tension of a spring 205 connected at one end to the operating arm as shown at 206 and connected at its opposite end to the solenoid plunger 64, as shown at 207. The plunger 64 is normally held in an upper position by means of a spring 214. However, when the solenoid 60 is energized, the plunger 64 thereof is moved downward against the action of the spring 214 to cause the operating arm 200 to move downward. In this way, the pawl 186 is rotated in a clockwise direction against the action of spring 194, and the lower end 208 of the indexing pawl 186 is raised to disengage the notch 184 in indexing shaft 182 which it previously engaged. The disengagement of the pawl 186 from the notch 184 in indexing shaft 182 allows the stepping rod 36 to move to the right as seen in FIG. 4 under the action of the spring 172. At the same time, the spring 194 causes the pawl 186 to move to the left as seen in FIG. 4. The upper end 209 of the pawl 186 which was previously engaged by the operating arm 200 on solenoid plunger 64 is thereby moved to the left from beneath the operating arm 200 whereupon spring 194 rocks the pawl 186 in a counter-clockwise direction around the pin 190, which is then located in the right-hand end of the slot 188 in the pawl 186. As a result, the lower end 208 of the pawl 186 is caused to enter the next notch 184' in the indexing shaft 182 to limit the movement of the indexing shaft and stepping rod 36 to the right under the action of the spring 172. On the other hand, the spring 172 then again moves pawl 186 to the right and causes the operating arm 200 on the plunger 64 to be rotated counterclockwise about its pivot pin 202. Thereafter, when the solenoid 60 is de-energized, spring 214 will raise the plunger 64 and the operating arm 200 and the lower end of the plunger will be returned to its vertical position by the spring 205 so that the lower end of the operating arm will be positioned above the upper end 209 of pawl 186 preparatory to the next operation of the solenoid to advance stepping rod 36 another step to the right.

Micro-switch 158 is operated by the arm 162 as previously described in connection with the construction illustrated in FIG. 1 whereby switch 158 will be opened to break the holding circuit by which relay 116 was energized and the cycle of operations will be completed.

In the practical application of the motion-translating and stepping mechanism as herein described, it is often desirable to control certain other electrical circuits in step with the indexing mechanism for the purpose of performing specific and variable functions within the equipment to which the said translator is attached. For example, lights 238 can be illuminated to indicate the position or number of steps the indexing mechanism has taken within a particular cycle of operation. Also, the recycling or return movement of the translator may be caused by providing current to return solenoid 85 upon completion of the indexing cycle of operation.

Figure 5:
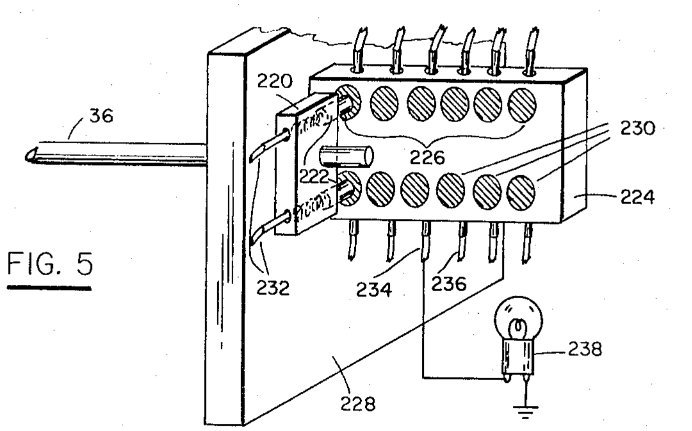
FIG. 5 is a perspective illustrating an electrical step switching mechanism that may be employed in equipment embodying the present invention.

Accordingly, as shown in FIG. 5, an electrical stepping switch may be attached to stepping rod 36. This switch may be connected to the right of return lever 80 and collar 83 or it may be secured to the opposite end of stepping rod 36 and to the left of the indexing mechanism. A brush block 220 containing one or a plurality of contacts 222 is affixed to stepping rod 36. A contact block 224 made of insulating material and containing a row of contacts 226 for each contact 222 in brush block 220 is attached to a fixed frame member 228. The spacing between the individual contacts 230 in contact block 224 is such that contacts 222 will be successively aligned with contacts 230 with each indexing movement of the stepping mechanism. Thus, it is possible for current to flow through line 232 and contacts 222 and 230 to line 234 to cause a lamp 238 to be lighted or to actuate other or associated equipment. With the next indexing movement of the stepping rod 36, the current through line 232 will switch to line 236. Thus, each successive indexing movement of stepping rod 36 will serve to move the switch brush block lines 232 to a new contact and to a different contact on block 224 to light a different lamp 238 or to control any other circuit desired. While, FIG. 4 illustrates two switching circuits, any practical number of switching circuits may be incorporated by having a row 226 of contacts 230 in the contact block 224 for each contact 222 in the brush block 220. Upon the resetting or returning of stepping rod 36 to its beginning position, the above-described switching mechanism will also return to its beginning position.

The form and construction of the control mechanism and circuitry arrangement described and illustrated can, of course, be varied considerably and may be altered to establish any desired sequence or timing of the operations necessary to actuate the translating equipment and the data processing equipment, business machine, or any other equipment with which they may be associated. Moreover, the system may be used in translating or utilizing many different types of coded input signals.

While the construction and circuitry shown includes solenoids responsive to the signals to be translated, any other suitable or preferred type of signal responsive means may be employed. Moreover, the signal impulses to be translated may be of a mechanical nature as when employing a keyboard, fluid operated or other means for impressing a coded signal on the equipment to actuate the same. Further, if desired, the form, construction and arrangement of the various parts of the equipment and the sequence of operation thereof are capable of many changes and modifications for the purpose of adapting the invention to any particular system. Thus, the invention may be used to apply information to cards, tapes or other data or information-storing or utilizing elements as exemplified in copending application Serial No. 287,275, or to recover information or data from such elements as exemplified in copending application Serial No. 272,485.

In view thereof, it should be understood that the particular embodiment of the invention shown in the drawings and described above is intended to be illustrative only and is not intended to limit the scope of the invention.

I claim:

1. In combination with data processing equipment or the like having a plurality of groups of mechanical elements operable to control the operation of said equipment, translating means for utilizing coded signal input impulses to actuate selected ones of said mechanical elements for controlling the operation of said equipment, said translating means comprising a plurality of signal responsive means corresponding in number to the number of said groups and selectively operable in response to signal input impulses, each one of said signal responsive means being associated with a separate group of said mechanical elements, an actuating member interposed between each one of said signal responsive means and that group of mechanical elements with which said one signal responsive means is associated, said actuating member being movable from an operative position to displace a selected one of the mechanical elements of said group when said signal responsive means is operated, and means operable each time a signal input impulse is impressed on any of said signal responsive means to move simultaneously all of said actuating members to said operative position with respect to selected ones of the mechanical elements of the groups associated with the respective actuating members.

2. The combination as set forth in claim 1 wherein said signal responsive means are solenoids.

3. In combination with data processing equipment or the like having a plurality of groups of mechanical elements operable to control the operation of said equipment, translating means for utilizing coded signal input impulses to actuate selected ones of said mechanical elements for controlling the operation of said equipment, said translating means comprising a plurality of signal responsive means corresponding in number to the number of said groups and selectively operable in response to signal input impulses, each one of said signal responsive means being associated with a separate group of said mechanical elements, an actuating member interposed between each one of said signal responsive means and that group of mechanical elements with which said one signal responsive means is associated, said actuating member being movable from an operative position to displace a predetermined one of the mechanical elements of said group when said signal responsive means is operated, a selecting member by which said actuating members are carried, and means for moving said selecting member to locate said actuating members in operative position with respect to said predetermined elements of said groups each time a signal input impulse is impressed on any of said signal responsive means.

4. In combination with data processing equipment or the like having a plurality of groups of mechanical elements operable to control the operation of said equipment, translating means for utilizing coded signal input impulses to actuate selected ones of said mechanical elements for controlling the operation of said equipment, said translating means comprising a plurality of solenoids corresponding in number to the number of said groups and selectively operable in response to signal input impulses, each one of said solenoids being associated with a separate group of said mechanical elements, an actuating member interposed between each one of said solenoids and that group of mechanical elements with which said one solenoid is associated, said actuating member being movable from an operative position to displace a predetermined one of the mechanical elements of said group when the solenoid associated with said member and group is operated, a selecting member by which said actuating members are carried, and means for moving said selecting member to locate said actuating members in operative position with respect to said predetermined elements of said groups each time a signal input impulse is impressed on any of said solenoids.

5. The combination as set forth in claim 4 wherein the selecting member is provided with ratchet teeth, and a pawl is engageable with said teeth to advance the selecting member and actuating members step by step from one of said positions to another.

6. The combination set forth in claim 4 wherein said selecting member and the actuating members carried thereby are movable step by step from initial positions to positions wherein each of the actuating members is successively located in operative position with respect to one after another of the mechanical elements of the group of such elements with which it is associated, and means are provided for returning said selecting member and actuating members to said initial positions.

7. The combination as set forth in claim 6 wherein means engageable by said selecting member upon predetermined movement thereof are operable to effect the return of said selecting member and actuating members to said initial positions.

8. The combination as called for in claim 6 wherein the selecting member has ratchet teeth thereon, a pawl engages said ratchet teeth and an additional solenoid is operable to move said pawl in a manner to advance the selecting member and actuating members one step each time a signal responsive solenoid is actuated.

9. Translating means for utilizing coded input signal impulses to actuate selected mechanical elements of data processing equipment or the like, said elements being arranged in a plurality of groups each of which includes a plurality of independently actuable elements, comprising a first selecting means selectively operable in response to signal input impulses to select which of the several groups of said mechanical elements are to have an element of said group actuated, and a second selecting means operable in response to input signal impulses to determine which elements of the selected groups are to be actuated, said second selecting means including members movable to actuate the selected mechanical elements of the selected groups.

10. Translating means as defined in claim 9 wherein said members are arranged to actuate mechanical elements selected from a series of elements of the same group that are positioned adjacent to each other.

11. Translating means for utilizing coded input impulses to actuate selected mechanical elements of data processing equipment or the like, said elements being arranged in a plurality of groups each of which includes a plurality of independently actuable elements, comprising a plurality of solenoids, one for each group, a plurality of signal input channels, each of which is connected to a separate, associated one of said solenoids to selectively energize the same, a plurality of actuating members, each of which is associated with a separate one of said solenoids and with one mechanical element of a predetermined one of said groups, and means responsive to the energizing of any of said solenoids for moving each actuating member from a position adjacent one mechanical element of the predetermined group with which it is associated to a position adjacent a different mechanical element in the predetermined group with which it is associated, each of said actuating members being movable to actuate the mechanical element adjacent thereto upon the energizing of the solenoid with which it is associated.

12. Means for actuating selected mechanical elements of a plurality of groups of such elements in data processing equipment or the like comprising a plurality of solenoids, each of which is located adjacent a corresponding group of mechanical elements to be actuated, a plurality of actuating members, each of which is located adjacent a separate, associated solenoid and adjacent each of the groups of mechanical elements to be actuated, said actuating members each being movable from a position wherein it can actuate one element of the group of mechanical elements adjacent thereto to a position wherein it can actuate a different mechanical element of the group adjacent thereto, means for moving said actuating members from one of said positions to another, each of said solenoids having a plunger operable when the solenoid is energized to move the actuating member associated therewith to cause the latter to actuate the mechanical element adjacent to which it is located, and means for selectively energizing said solenoids.

13. The combination as set forth in claim 12 wherein the means for moving the actuating members from one position to another comprises a rod by which the actuating members are carried, said rod having ratchet teeth thereon, a pawl engaging said ratchet teeth and solenoid actuated means for moving said pawl momentarily out of engagement with said ratchet teeth to control the movement of said rod and actuating members with respect to said mechanical elements.

14. Translating means for actuating mechanical elements of data processing equipment or the like in response to coded signal input impulses, said elements being arranged in a plurality of groups each of which includes a plurality of independently actuable elements, comprising a plurality of selectively operable signal responsive solenoids, each of which is associated with a different group of the mechanical elements to be actuated, a plurality of actuating members, each of which is associated with a separate one of said solenoids and with the groups of mechanical elements associated with said one solenoid, said actuating members being formed to engage a single one of the mechanical elements of the group of elements with which it is associated, a rod by which said actuating members are carried, said rod being movable lengthwise thereof from one position to another to locate each actuating member carried thereby in position to actuate one after another of the mechanical elements of the group of elements with which the actuating member is associated, means for advancing said rod and actuating members step by step from one of said positions to another, each of said solenoids having a plunger movable in response to the energizing of the solenoid by an input signal impulse, means associated with each solenoid and pivotally movable by the plunger thereof, said means having a sliding engagement with the actuating member associated with the solenoid so as to remain in operative relation with the actuating member in each position to which the actuating member is moved to cause each actuating member to displace one of said mechanical elements of the group with which it is associated each time the solenoid associated therewith is energized.

15. Translating means for actuating mechanical elements of data processing equipment or the like in response to coded signal input impulses, said elements being arranged in a plurality of groups each of which includes a plurality of independently actuable elements, comprising a plurality of selectively operable signal responsive solenoids, each of which is associated with a different group of the mechanical elements to be actuated, a plurality of actuating members, each of which is associated with a separate one of said solenoids and with the group of mechanical elements associated with said one solenoid, said actuating members being formed to engage a single one of the mechanical elements of the group of elements with which it is associated, a rod by which said actuating members are carried, said rod being movable lengthwise thereof from one position to another to locate each actuating member carried thereby in position to actuate one after another of the mechanical elements of the group of elements with which the actuating member is associated, means for advancing said rod and actuating members step by step from one of said positions to another, each of said solenoids having a plunger movable in response to the energizing of the solenoid by an input signal impulse, means asociated with each solenoid and pivotally movable by the plunger thereof, said means having a sliding engagement with the actuating member associated with the solenoid so as to remain in operative relation with the actuating member in each position to which the actuating member is moved to cause each actuating member to displace one of said mechanical elements of the group with which it is associated each time the solenoid associated therewith is energized, said means for advancing the rod and actuating member from one position to another comprising spring means urging the rod and actuating members in one direction, ratchet teeth carried by the rod, a pawl movable into and out of engagement with the ratchet teeth to limit the movement of the rod and actuating members under the action of said spring means, a spring connected to the pawl and urging said pawl into engagement with said ratchet teeth, an additional solenoid operable when energized to retract said pawl from said ratchet teeth, and a lost motion connection between said additional solenoid and pawl permitting return movement of said pawl into engagement with a ratchet tooth under the action of the spring connected thereto after said additional solenoid has been energized.

16. Translating means of the character set forth in claim 15 wherein means are provided for returning said rod and actuating members to an initial position upon the occurrence of a predetermined number of operations of the translating means in response to coded signal input impulses.

17. In combination with data processing equipment or the like having a plurality of groups of mechanical elements operable to control the operation of said equipment, translating means for utilizing coded signal input impulses to actuate selected ones of said mechanical elements for controlling the operation of said equipment, said translating means comprising a plurality of solenoids corresponding in number to the number of said groups and selectively operable in response to signal input impulses, each one of said solenoids being associated with a separate group of said mechanical elements, an actuating member interposed between each one of said solenoids and that group of mechanical elements with which said one solenoid is associated, said actuating member being movable from an operative position to displace a predetermined one of the mechanical elements of said group when the solenoid associated with said member and group is operated, a selecting member by which said actuating members are carried, means for moving and selecting member to locate said actuating members in operative position with respect to said predetermined elements of said groups each time a signal input impulse is impressed on any of said solenoids, a switching member connected to said selecting member and movable thereby from one position to another, and electrically actuated means operable in timed relation with respect to said translating means and controlled by said switching member.

18. In combination with data processing equipment or the like having a plurality of groups of mechanical elements operable to control the operation of said equipment, translating means for utilizing coded signal input impulses to actuate selected ones of said mechanical elements for controlling the operation of said equipment, said translating means comprising a plurality of solenoids corresponding in number to the number of said groups and selectively operable in response to signal input impulses, each one of said solenoids being associated with a separate group of said mechanical elements, an actuating member interposed between each one of said solenoids and that group of mechanical elements with which said one solenoid is associated, said actuating member being movable from an operative position to displace a predetermined one of the mechanical elements of said group when the solenoid associated with said member and group is operated, a selecting member by which said actuating members are carried, means for moving said selecting member to locate said actuating members in operative position with respect to said predetermined elements of said groups each time a signal input impulse is impressed on any of said solenoids, and circuit elements actuated in response to the energizing of one of said solenoids by a signal input impulse and operable to initiate and insure the completion of a cycle of operations each time one of said solenoids is energized.

References Cited by the Examiner

UNITED STATES PATENTS

| | | | |
|---|---|---|---|
| 2,924,382 | 2/1960 | Saxby | 235—155 |
| 3,073,897 | 1/1963 | MacNeil et al. | 178—26 |

MAYNARD R. WILBUR, *Primary Examiner.*

MALCOM A. MORRISON, *Examiner.*

W. J. ATKINS, *Assistant Examiner.*